Dec. 31, 1963 J. J. ARPS 3,115,942
METHOD OF EARTH BOREHOLE INVESTIGATION
Original Filed Feb. 21, 1955 2 Sheets-Sheet 1

INVENTOR.
JAN J. ARPS

Dec. 31, 1963          J. J. ARPS          3,115,942
METHOD OF EARTH BOREHOLE INVESTIGATION
Original Filed Feb. 21, 1955          2 Sheets-Sheet 2
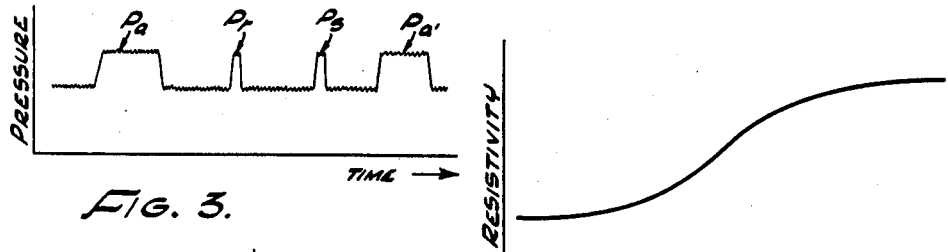
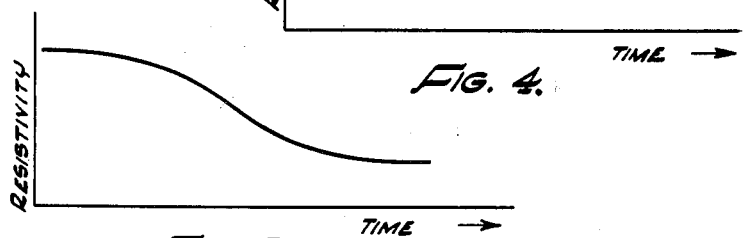
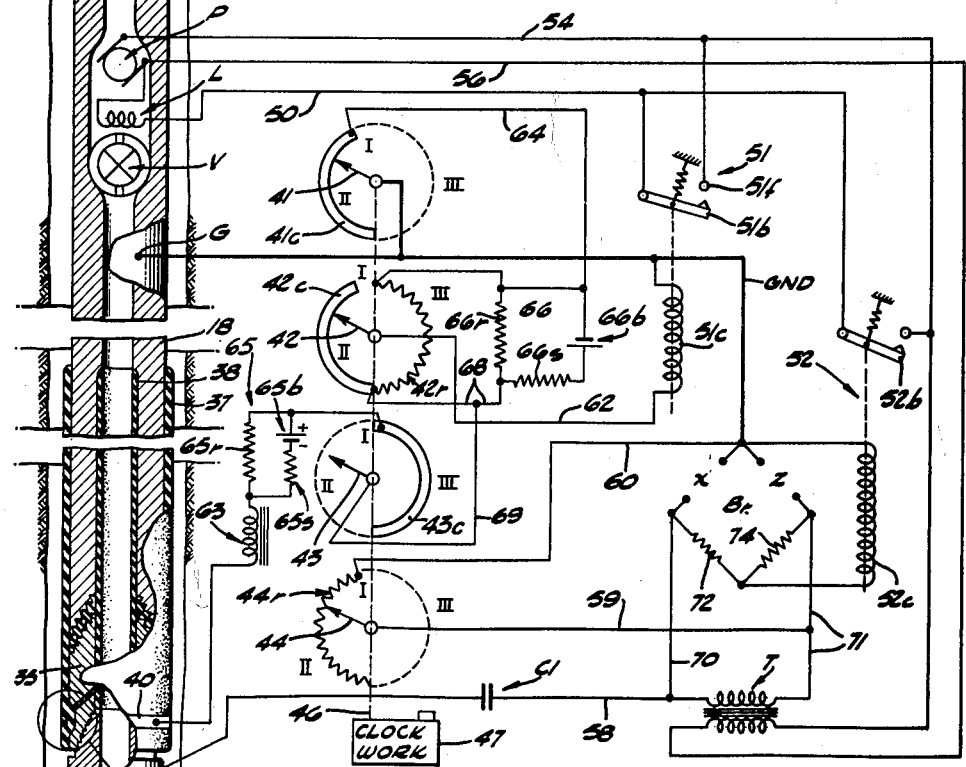
INVENTOR.
JAN J. ARPS United States Patent Office 3,115,942
Patented Dec. 31, 1963

3,115,942
METHOD OF EARTH BOREHOLE
INVESTIGATION
Jan J. Arps, Dallas, Tex., assignor to The Arps
Corporation, Dallas, Tex., a corporation of
Delaware
Continuation of application Ser. No. 489,537, Feb. 21,
1955. This application Apr. 13, 1962, Ser. No. 187,315
8 Claims. (Cl. 175—50)

The present invention relates to a mode and system for investigating certain characteristics of a portion of earth at the lower end of an earth penetrating borehole, and, more particularly, the present invention relates to a new method and apparatus for logging earth boreholes whereby an indication of a selected physical characteristic, such as the porosity of a newly penetrated permeable earth formation, or the permeability thereof, may be obtained. In the drilling of deep earth boreholes such as are formed in drilling oil wells, it is of considerable value to know the relative porosities and/or permeabilities of the several strata penetrated by the borehole. Such information is of considerable value in oil-producing operations involving the drilled well and other adjacent wells, as well as of value in evaluating potential oil-producing zones along the well being drilled.

This is a continuation of my copending application Serial No. 489,537, filed February 21, 1955, now abandoned.

Conventional methods of investigating earth formation characteristics and logging of same involve withdrawal of the drill string from the borehole and the traversal of the borehole with special electrical apparatus suspended from an electric conductor cable. Aside from the great loss of drilling time and other expenses and inconveniences incident to such mode of logging, more serious objections to such mode are (a) that the logging cannot, for economic reasons, be performed as frequently as is desirable, (b) that drilling is always ahead of logging so a formation may be drilled into deeply when it is not desirable to deeply penetrate the particular stratum or formation, and (c) by the time the logging is performed the formations have been invaded by drilling mud filtrate, which leaves a mud cake on the borehole wall and percolates outwardly from the borehole through the formation at a rate dependent upon, inter alia, the porosity and/or permeability of the formation, the nature of the connate fluid, in the formation, and the type and pressure of the drilling mud. Presence of mud cake on the borehole wall and invasion of the formation by mud filtrate prior to logging cause a marked deterioration of the clarity and accuracy of the logging. The system of the present invention avoids all the mentioned disadvantages of prior logging systems, and additionally provides an important new type of information concerning formation porosity and/or permeability, heretofore not available to the operator.

It is therefore, a principal object of the present invention to provide a logging system and method of logging whereby the characteristics of newly penetrated earth formations or strata are immediately and continuously available to the driller. Another object of the invention is to provide a system or mode of investigation of newly drilled earth formations which provides an indication of a physical characteristic of the formation being drilled, at any desired time during drilling. The physical characteristic is any that may be chosen or selected from the group comprising porosity and permeability to a liquid filtrate. Another object of the invention is to provide a novel mode of providing an indication of the porosity of an earth formation at the lower end of an earth borehole. Another object of the invention is to provide a mode and apparatus for measuring and indicating the varying value of an electrical characteristic of the earth, such as electrical resistivity, of a newly drilled portion of the earth at the lower end of a borehole, as invasion of the portion of the earth by drilling mud filtrate progresses. It is known that changes of such electrical characteristics are functions of, that is, are functionally related to, certain physical characteristics of the earth such as porosity and permeability. It is an additional object of the invention to provide a mode and apparatus for logging the resistivity of a portion of the earth at the lower end of an earth borehole before, during, and after invasion of the formation by mud filtrate, whereby an indication of the porosity and/or permeability of the formation can be derived.

The previously stated objects, and other objects and features of novelty which will hereinafter be made apparent, are attained by the invention, a preferred form of apparatus and mode of operation of which are explained and illustrated in the following description considered in conjunction with the accompanying drawings, in which lke reference characters indicate like parts in the several figures, and in which:

FIG. 2 is an illustration, partly diagrammatic and partly schematic, depicting the environment and relative placement of components of the apparatus located, when in operation, at the bottom or lower end of the borehole, and including a circuit diagram of electrical components and connections of the apparatus at that location;

Figure 1:
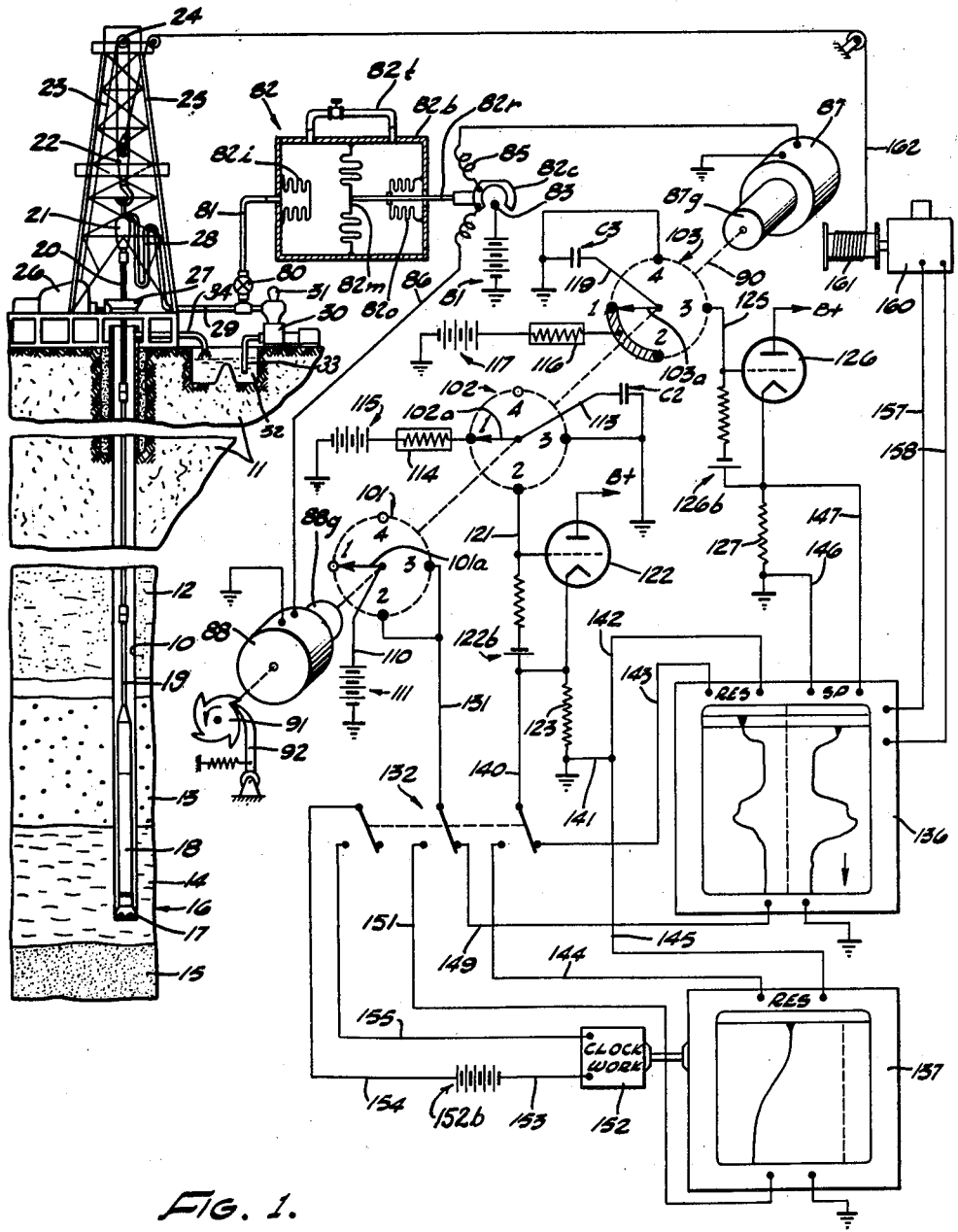
FIG. 1 is an illustration, partly diagrammatic and partly schematic, depicting a typical environment in which the apparatus of the preferred embodiment is employed, and including diagrams of some components of the apparatus and circuit diagrams of other components of the apparatus located outside the borehole.

FIG. 3 is a diagram illustrating pressure changes created in the drilling mud stream within a drill string at a location near the bottom end of the drill string and as evidenced at a pressure transducer hydraulically communicating with the mud stream supplied to the drill string outside the borehole; and FIGS. 4 and 5 are diagrams illustrating changes in formation resistivity with passage of time, under differing conditions at the bottom of an earth borehole.

Referring now to the drawings, and to FIGURE 1 in particular, there is illustrated a typical earth borehole 10 being drilled through successive earth strata or formations, including formations 11, 12, 13, 14, and 15, by means including a drill bit means 16 comprising a drill bit 17 secured to the lower end of a sectional drill collar 18 which with the bit means forms the lower portion of an otherwise conventional drill string 19 comprising one or more sections of drill pipe, and a kelly 20. The kelly and drill string are suspended in conventional manner from a rotary swivel 21 carried by a travelling block 22 supported for vertical movement by a cable 23 rigged in conventional manner about a crown block 24 supported by a suitable derrick 25, the cable extending to and being operated by a draw works 26. The draw works supplies power through level gearing 27 for rotating the kelly, drill string, and drill bit means. The drill string, including the drill bit means, drill collar, drill pipe and kelly, and the swivel, are all provided with one or more suitable internal passages through which is pumped, under pressure, a stream of drilling mud supplied to the swivel through a rotary hose 28 and a conduit 29 by a pump 30, the hose permitting travel of the swivel, kelly, drill string and drill bit means as the borehole is extended during the drilling operations. If desired, as when circulating drilling mud is employed for transmitting information at the bottom of the borehole to a location at the surface of the earth outside of the borehole, the pump may be operated during drilling, as is usual; and also may be operated to circulate mud through the drill string and borehole during suspension of drilling. Suspension of drilling may be effected so as to terminate attempted forward progress in extending the depth of the borehole by, for example, stopping rotation of the drill string by the draw works, or by removing weight from the bit, or both.

Pump 30 is provided with a suitable surge bell or tank 31 serving to reduce pulsations in the discharge of the pump, and draws the drilling fluid or mud from any suitable source such as a supply sump 32, through an intake pipe 33. The drilling mud forced downwardly through the drill string and out orifices in the drill bit returns to the surface through the annular space encircling the drill string, carrying with it the drill chips, and is discharged from the upper cased portion of the borehole through a suitable means such as pipe 34, through which the fluid is passed to a convenient location for screening, settling and return to sump 32. Thus the drilling mud is circulated by the pump through the drill string and the borehole as beforementioned, and may be so circulated whether the drill string is rotating or stationary.

The thus-far enumerated structures, with the exception of drill collar 18 and the drill bit means, are conventional, and may be of any suitable construction and arrangement and are shown to illustrate the environment of the invention and aid in a clear explanation of the operation of the preferred embodiment of apparatus hereinafter described.

While any suitable means may be employed for transmitting or conveying the information obtained at the bottom of the borehole to a location at the surface of the earth outside the borehole, the information is, in the illustrated preferred embodiment of the system of the invention, converted into repetitive series of electric current pulses by automatically acting apparatus housed in the drill collar, the electric current pulses being translated into an equivalent series of signals in the form of pressure changes created at the lower end portion of the drill string in the downwardly flowing stream of drilling fluid within the drill string. The pressure change signals are quickly transmitted in and by the drilling fluid, which acts as a signal transmission medium, upwardly and out of the borehole to a suitable transducer mechanism which serves to retranslate the pressure changes into indications suitable for interpretation and utilization by the driller or operator at any convenient accessible place. The pressure changes in the stream of drilling fluid and which may be created or produced by suitable means such as an electromagnetically actuated fluid valve means interposed in the drilling fluid stream and controlled by the aforementioned series of electric current pulses, can be either positive or negative relative to a predetermined mean value, such as, for example, (a) increases in pressure relative to a predetermined normal pressure effected by partial closing of the valve means from a given position, or (b) decreases in the pressure effected by opening of the valve means from a given position, or (c) sequential combinations of the two. In either case, the pressure returns to a predetermined normal value after each pressure change. In the preferred embodiment of apparatus of the system of the invention herein disclosed, the pressure changes are chosen arbitrarily to be positive or increases in pressure to a value somewhat above normal, followed in each case by a return of the pressure to normal value. Thus the pressure changes may be considered to be pressure-change signals broadly, and are hereinafter so considered. To provide for greater ease and accuracy in translating or interpreting and evaluating the signals, the signals formed in each series may include a reference signal or pressure change of distinctive character such as of relatively long duration, and a plurality of information-representing pressure changes or signals of shorter duration, each of which by a suitable relationship or characteristic represents information obtained by apparatus within the borehole. The characteristic or relationship of the pressure-change signals employed in the disclosed embodiment of the system of the invention for representing information is for convenience chosen to be the time interval between the commencement of a reference pressure-change signal and the commencement of a following information-representing pressure-change signal. In the illustrated embodiment, two different sources of information are employed in the apparatus within the borehole, and the signal-producing means is according actuated by suitable regularly operating control means including a clockwork, to produce repetitive series of signals, each series including a definitely timed reference signal followed by two variably timed information-representing signals. Hereinafter, the signals will represent measured values determined by measurement of an electrical characteristic of the earth.

Referring now to FIG. 2, drill bit 17 is depicted in drilling position at the lower end of borehole 10, connected to a short sub 35 which is in turn supported from drill collar 18 by a conventional insulated joint 36. Sub 35 and drill collar 18 are of somewhat special configurations, as indicated, or for reasons hereinafter made apparent. Also, the generally cylindrical lower interior and exterior surfaces of collar 18 and the sub are insulated electrically from the drilling mud by interior and exterior insulating jackets 38 and 37, respectively. The jackets are preferably firmly secured to the drill collar and sub by suitable bonding means and procedure. The sub and collar are provided with internal passages for accommodating the downward flow of drilling mud, and drill collar 18 is provided with enlargements in its bore for accommodation of an apparatus case (not shown) and recesses and passages for the accommodation of insulated wires, all as more particularly described and illustrated in my U.S. application Serial No. 431,734, filed May 24, 1954, now Patent No. 2,917,704, issued December 15, 1959, to which reference may be made for additional details. Also, the drill collar is provided with an enlarged bore portion in which are housed a power source P, which may be in the form of a fluid-driven turbine-generator unit, as disclosed in my U.S. application Serial No. 55,-301, now Patent No. 2,659,046, or a suitable battery and chopper unit of conventional form and an electromagnetically operated drilling mud valve device indicated generally by V and having an actuating magnet coil L, more fully described and illustrated in my U.S. applications Serial No. 443,308, filed July 14, 1954 (now Patent No. 2,759,143, issued August 14, 1956), Serial No. 414,-381, filed March 5, 1954 (now Patent No. 2,925,251, issued February 16, 1960), and Serial No. 182,604, filed August 31, 1956 (now Patent No. 2,787,759, issued April 2, 1957).

In the present invention bit 17 is employed as an electrode in apparatus automatically acting to measure the resistivity of the earth formation at the lower end of the borehole; and a separate electrode is employed by the same apparatus to measure the self-potential (SP) of the formation. To the latter end, sub 35 is provided with an encircling annular groove in which a portion of jacket 37 resides and in which, seated in the insulation but exposed at its outer surface, is a ring electrode 40, preferably of a material or alloy not easily polarized, such as carbon or gold. Details of the ring electrode mounting and electrical conductor connection are illustrated in the magnified portion of FIG. 2, wherein an insulated conductor is secured to the interior of electrode 40 and passes through an insulated transverse bore in the sub to a groove along the bore of sub 35 and the drill collar, to the apparatus case (not shown).

The electrical apparatus indicated in the circuit diagram at the right of the drill collar in FIG. 2, is, in general, contained in the apparatus case situated within the drill collar, the mounting thereof being of any suitable type but preferably as illustrated in my aforementioned applications, now issued. The electrical apparatus used at the bottom of the borehole includes the bit electrode, electrode 40, the power plant P, the electromagnetically operated signal-producing valve V, and that apparatus indicated in the circuit diagram portion of FIG. 2. The latter apparatus includes four synchronously rotated switches having respective wiper arms 41, 42, 43, and 44, each mounted on and insulated from a driving shaft 46 (indicated by a dotted line) turned by a clockwork 47. Each of the wiper arms forms a part of a respective rotary switch, and has electrical connection to an individual external circuit by means of an individual conventional slip ring and brush structure (not shown). Clockwork 47 rotates shaft 46 at a slow uniform rate of, for example, one-half revolution per minute. Thus the wiper arms are rotated through successive periods I, II, and III, corresponding to sectors of rotation as indicated in FIG. 2. During certain of the periods, the wiper arms contact respective conductor segments and/or resistor segments, whereby the time periods of functional operations of the sub-surface apparatus are controlled, as will be hereinafter made apparent. Wiper arm 41 engages a conductor segment 41c during period II, arm 42 engages a conductor segment 42c during period II and a resistor segment 42r during period III, etc., all of the wiper arms being in open-circuit condition during period I. The conductor segments 41c, 42c, 43c, and the resistor segments 42r and 44r are mounted on suitable insulation mounts (not shown) such as wafers, as is well understood in the electrical switch art.

The electromagnetically operated signal-producing valve V is interposed in the flow channel or stream path of the drilling mud forced downwardly through the drill string, and is operable from a normal open condition to a closed or partially closed condition by action of its coil L when the latter is energized (or vice versa); all for the purpose of producing a pressure-change signal in the drilling mud stream when coil L is energized. Obviously, the length of the signal produced is dependent upon the time interval during which coil L is energized. Coil L has one terminal connected to a first terminal of the power plant as indicated, and its other terminal to a lead 50 which is in turn connected to the blade contacts 51b and 52b of respective relays 51 and 52 as indicated. The relays have respective fixed contacts cooperable with their blade contacts to close a circuit through coil L, the fixed contacts being connected to a lead 54 connected in turn to a second terminal of the power plant P. Thus it is evident that closure of the contacts of either of relays 51 and 52 will result in energization of coil L and actuation of valve V to produce a pressure-change signal in the drilling mud stream. Relays 51 and 52 have their blade contacts urged toward a normally closed condition by spring means as indicated, so that when either or both of the relays is de-energized, the respective relay contacts will close and initiate operation of valve V to produce a pressure-change signal.

Referring again to FIG. 2, alternating current from power plant P is supplied through leads 54 and 56 to the primary Tp of a transformer T, whose secondary Ts supplies current through leads 58, 59, 60, and the ground lead GND for application to the bit electrode (bit 17) and a remote ground connection indicated at G, for measuring the resistivity of the earth formation surrounding the lower portion of the bit. The bit current path is from secondary Ts, through lead 58, capacitor C1 to bit 17, the earth and borehole fluid to ground connection G, through ground lead GND, lead 60, resistor segment 44r, wiper arm 44, lead 59 and lead 71 to secondary Ts. The times during which such current is supplied to the bit are governed by clockwork 47 and wiper arm 44 as it contacts resistor segment 44r during period II. Thus current from transformer T cannot be fed to bit 17 during periods I and III. As will appear from the following description, other operations are performed during periods I and II.

As shaft 46 is slowly rotated, the several wiper arms move in counterclockwise direction, as viewed in FIG. 2, through successive periods I, II, and III. As the arms move from period III to period I, arm 43 moves off segment 43c and arm 42 moves off segment 42r, and sensitive relay 51, which is of the nonpolarized, quick-acting, slow-release, direct-current type, becomes de-energized because its energizing circuit, hereinafter explained, is opened at arm 42. As a consequence, contacts 51f, 51b close and coil L is energized and valve V actuated to produce a pressure-change signal in the mud stream. This signal is of relatively long duration, namely, that of period I, and serves as a reference signal such as is indicated by Pa in FIG. 3, from whose commencement is determined values indicated or represented by other following pressure-change signals of shorter duration.

As the wiper arms move from period I to period II, arm 41 moves onto segment 41c, arm 42 onto segment 42c, and arm 44 moves onto segment 44r. This period is devoted to measurement of resistivity of the formation, period III being reserved for measurement of self-potential of the formation, as will hereinafter be made fully apparent. As wipers 41, 42, and 44 make their contacts, there is closed a relay energizing circuit including wiper 42, conductor 62, coil 51c of relay 51, the ground lead GND, arm 41, segment 41c, conductor 64, a potential network 66, conductor 68, and segment 42c. This circuit energizes relay 51, maintaining its contacts open, during all of period II. Potential network 66 is such as to provide across resistor 66r a voltage of 250 mv. Thus the battery 66b may be of 1.5 volts, resistor 66s of 1250 ohms, and resistor 66r of 250 ohms. Thus 250 mv. potential is supplied to energize the coil of relay 51 during period II. As wiper 44 closes with segment 44r, alternating current supplied by the secondary of transformer T flows through conductor 58 and blocking condenser C1 to bit 17, thence into the earth surrounding bit 17 and extending to the ground connection G on to ground lead GND, through conductor 60, segment 44r, wiper 44, and conductors 59 and 71 to the secondary of T. The transformer secondary is also connected by way of conductors 70 and 71 to opposed terminals of a bridge network Br which has as lower limbs equal-valued resistors 72 and 74. As is made clearly evident in FIG. 2, the upper limbs of Br, namely X and Z, comprise, respectively, the bit-to-ground resistance of the earth, and the varying resistance between conductors 59 and 60 as 44 moves over 44r. Connected across the upper and lower terminals of bridge network Br is the coil 52c of a sensitive A.-C. relay 52 of the quick-acting slow-release type. While wiper arm 44 is off segment 44r, and when arm 44 first contacts segment 44r, the bridge network is unbalanced and current flows through the coil of relay 52, maintaining its contacts in normally open condition. As wiper arm 44 moves along segment 44r during period II, a point is reached at which the bridge network becomes balanced, the resistances of limbs X and Z then being equal. At that time the contacts of relay 52 close, and valve V is caused to produce a second pressure-change signal (hereinafter designated Pr) in the drilling mud stream. Since the wiper arms are moved at a uniform rate, the amount of resistance of 44r that is effective in the bridge network when the latter is balanced is a function of the elapsed time between the commencement (or the termination) of the reference pressure-change signal Pa created during period I and the commencement of the second pressure-change signal Pr. Thus the elapsed time also bears a definite relationship to the bit-to-ground resistance, that is, is a function of the latter. Since the resistivity of the earth formation may readily be computed from the resistance measurement effected, bearing a definite functional relationship thereto, the interval between the reference signal (hereinafter designated Pa) and signal Pr, is a function of the earth formation resistivity. Shortly after valve V has been actuated to produce signal Pr, the bridge network becomes again unbalanced due to continued movement of wiper arm 44, and relay 52 opens to terminate signal Pr. Thus it is seen that signal Pr is indicative or representative of a measured value of the resistivity of the portion of the earth at or around the lower end of the borehole.

As the wiper arms move from period II to period III, the bit electrode becomes de-energized as arm 44 moves off segment 44r. At this time, electrode 40 becomes energized as arm 43 moves onto segment 43c, the circuit being; electrode 40, choke coil 63, potential network 65, segment 43c, arm 43, conductors 69 and 68, segment 42r, arm 42, conductor 62, coil 51c of relay 51, the ground lead GND, G, and the earth between G and electrode 40. Potential network 65 is constituted, for example, with a battery of one and one-half volts in series with a resistor 65s of 1250 ohms, the two being connected across a resistor 65r of 250 ohms, as indicated in FIG. 2, so a potential of 250 mv. is created across resistor 65r for energizing the circuit of electrode 40. Since the self-potential (SP) of the earth formation, as evidenced between ground G and electrode 40, will seldom if ever exceed —200 mv., it is evident that conductor 69 will always during period III be at a positive potential with respect to ground at point G. Thus, as the wiper arms progress through period III there will be sensed by arm 42 a potential which varies from a positive value equal to the difference between the voltage across resistor 65r and the bit-to-ground (N.P.) potential through zero value and to a negative value equal to the difference between the potential on conductor 69 and the 250 mv. potential appearing across 66r and across 42r. Thus if the N.P. is, for example, —100 mv., bit to ground, the potential sensed by arm 42 and applied to coil 51c will vary from (250—100=+150), through zero, and to (250—100)—250=—100 mv.

During period II the potential of potential net 66 is applied to the coil of relay 51 and causes that relay to remain energized to keep its contacts open during the resistance measurement. Thus, as the arms move into period III, relay coil 51c remains energized to keep its contacts open as previously noted. As arm 42 progresses over segment 42r during period III, the potential across the coil of relay 51 changes, in the algebraic sense, from the mentioned positive value (150 mv.), to a zero value, and on to the negative value as indicated. As zero value is reached, relay 51 falls out, that is, contacts 51b–51f close, causing valve V to be actuated to initiate creation of a third pressure-change signal (indicated as Ps in FIG. 3). The interval of time between the beginning of period III and creation of signal Ps, is thus seen to be dependent upon the value of the earth formation self-potential as evidenced between electrode 40 and ground G; it being noted that choke coil 63 serves to exclude any alternating potentials from conductor 69 during period III. Thus the interval between reference signal Pa and signal Ps is also mathematically related to and hence is a function of the self-potential (SP). Shortly after initial actuation of relay 51, the negative potential sensed by arm 42 is applied to the coil of relay 51, with the result that the contacts of the relay open, permitting valve V to return to normal condition and thus terminating signal Ps. Relay 51 then remain energized with its contacts open until arm 42 moves off segment 42r at the end of period III, at which time the first cycle of a repetitive and cylindrical procedure of measuring and signaling is completed and the next cycle is commenced. The cycle commences with the commencement of a signal Pa at the beginning of period I, as is now obvious.

The cyclically repeated series of signals created in the drilling mud stream and representing measurements of earth resistivity and self-potential, are transmitted through the mud stream as a signal transmission medium, to the upper end of the borehole and on to surge chamber 31. The signals or pressure changes are also transmitted from conduit 29 into and through a valve 80 and tubing 81 to a pressure transducer designated generally by 82. Transducer 82 is provided and constructed to convert drilling mud pressure changes of the nongradual type and above a predetermined amplitude, into electrical pulses of duration proportional to the pressure-change durations. The transducer may be of any suitable type but as diagrammatically indicated in FIG. 1 it comprises essentially a fluid-tight box 82b divided into two chambers by a fluid tight flexible membrane 82m, an inlet bellows 82i, an output bellows 82o, a capillary or restricted-bore tube 82t intercommunicating the two chambers, and an output rod 82r which is supported by membrane 82m and bellows 82o. Rod 82r is secured at one end to membrane 82m, extends through a sealed opening in bellows 82o, and extends outwardly from the interior of box 82b through an opening, as indicated. Bellows 82i and 82o are sealed around their respective base peripheries to box 82b as indicated, and tubing 81 communicates with the interior of bellows 82i as indicated. At its outer end rod 82r carries an insulated double-acting contact 82c which is arranged, upon translation of the rod due to flexing of membrane 82m, to close a branched electric circuit. The construction of the transducer is such that relatively slow changes in the drilling mud pressure, such as result from increasing depth of borehole, etc., have no effect on membrane 82m, the pressure in the two chambers of box 82b equalizing by relatively slow passage of fluid through the restricted bore of tube 82t. Further pressure changes of small amplitude, such as are caused by pump 30 and pass by surge tank 31, after damping by valve 80, are of insufficient magnitude to extend bellows 82i and move membrane 82m and compress bellows 82o (or vice versa) sufficiently to move rod 82r enough to cause contact 82c to close a circuit. When pressure changes of relatively rapid rise or fall, such as are caused by actuation of valve V in the borehole, occur, however, the transducer is operated to the extent that contact 82c closes the branched electrical circuit during the period of duration of any such change in pressure. Hence contact 82c closes the branched circuit indicated, in response to each of the aforementioned signals Pa, Pr, and Ps, transmitted from the lower end of the drill string.

Contact 82c is arranged to coact with a relatively fixed contact 83 which is connected to one terminal of a battery B1 the other terminal of which is grounded, all as indicated in FIG. 1. Branch conductors 85 and 86 are connected to contact 82c, as indicated, and extend to respective electromagnetic stepping ratchet-type motors 87 and 88, the motor circuits being completed to ground as indicated. Motor 88 has a slow-acting magnet such as are employed in slow-acting relays, whereby that motor will step only after being energized for a period of time greater than the duration of either of signals Pr and Ps, but is such as to step to the next ratchet tooth when energized nearly as long as the duration of a reference signal Pa. Thus when a reference signal (Pa) is received at the transducer, motor 88 is actuated; but the shorter signals Pr and Ps are of too brief duration to cause operation of that motor. Motor 88 is provided with a gear box 88g whereby when the motor is stepped one step, the gearing rotates an insulated driven shaft indicated by the dotted line 90, one revolution or the remainder of a full revolution if shaft 90 has previously been rotated only part of a full revolution from a predetermined initial position.

Motor 87, similar to motor 88 but having a quick-acting magnet, is such as to step when energized by brief pulses of current; and has a gear box 87g also connected to shaft 90 to drive the latter, the motor and gearing being such that upon energization of motor 87, it rotates shaft 90 only one-fourth revolution. The motors may have like numbers of ratchet teeth, but they have gear boxes with different ratios of gearing, and are so connected to shaft 90 through their respective gear boxes that upon energization of either the ratchet wheel of the other is rotated. The motors may be of any suitable type, or such as are available under the trade name "Ledex" and disclosed in U.S. Patent No. 2,496,880, motor 87 having a fast-acting magnet and motor 88 having a slow-acting magnet. Shaft 90 is provided with a four-tooth anti-reverse ratchet wheel 91 and pawl 92, as indicated, to permit rotation as indicated and prevent reverse rotation of the shaft under the influence of the return spring of motor 88. It will be noted that when a short pressure-change signal is received at the top of the well or borehole, a short pulse of current will be supplied to both the motors, and motor 87 will quickly rotate all of the gearing and shaft 90 one-fourth revolution; i.e., one tooth of the holding ratchet 91, and one station of each of a set of switches operated by shaft 90 and presently described. Motor 88 will not be energized long enough to operate. As shaft 90 rotates through 90° from an initial position, it rotates the gearing of box 88g, and the ratchet wheel of motor 88 will be rotated one-fourth of one stop or tooth. If a second short signal is then received, the action will be repeated. If, following one or two short signals, a long signal is received, both motors operate, motor 87 first rotating shaft 90 through 90° and motor 88 then rotating the shaft the amount required to complete one full revolution to return the shaft to initial position. It is evident that operations at the signal receiver are normally commenced by receipt of a reference signal (Pa), after which two short signals (Pr and Ps) are received. Accordingly, operations will normally be commenced with shaft 90 positioned with its switch arms at respective stations indicated by the numerals 1 in FIG. 1, as will hereinafter be made fully apparent.

Shaft 90 is provided for the purpose of performing circuit switching functions by imparting step-like movements to a plurality of rotary switch elements which act to switch electric circuits for translation of the received signals. Three rotary-type step-by-step switches are arranged along shaft 90 for the purpose indicated; each switch comprising an insulated rotary wiper arm and associated insulated slip ring and brush means mounted on shaft 90, and a stationary insulative wafer equipped with four peripheral contacts or stations arranged about the respective wiper arm for cooperation therewith in known manner. The switches, indicated by numerals 101, 102, and 103 have respective wiper arms, indicated by 101a, 102a, and 103a, are operated in unison by shaft 90, and have their stations numbered from 1 through 4 in a counterclockwise direction, a indicated in FIG. 1. Connections from the switches to components of the signal translating apparatus are indicated in FIG. 1 and as follows. Wiper arm 101a is connected by conductor 110 to one terminal of a battery 111, the other terminal of which is grounded. Arm 102a is connected by wire 113 to one terminal of a capacitor C2 whose other terminal is grounded and also connected to contact 3 of the same switch, as indicated. Contact 1 of switch 102 is connected through a constant current device 114 to one terminal of a battery 115 whose other terminal is grounded. Stations 1 and 2 of switch 103 are "strapped" together as indicated, and connected through a constant current device 116 to one terminal of a battery 117 whose other terminal is grounded. Wiper arm 103a is connected by a conductor 119 to one terminal of a capacitor C3 whose other terminal is grounded and connected to contact 4 of switch 103, as indicated. Terminal 2 of switch 102 is connected by wiring 121 to the control grid circuit of a negatively biased electron tube 122 which has a load resistor 123 in its cathode circuit, as indicated. The bias is supplied by a battery 122b as indicated. Terminal 3 of switch 103 is connected by wiring 125 to the control grid circuit of a negatively biased electron tube 126 which has a load resistor 127 in its cathode circuit as indicated. Bias for this tube is supplied by a battery 126b as indicated. Stations 2 and 3 of switch 101 are connected together and connected by wiring 131 to the middle pole of a three-pole double-throw switch 132 which is used to shift driving power and resistivity signal translations from a primary two-channel recorder 136 to a secondary recorder 137 and to control current to a clockwork, as hereinafter explained.

The output voltage evidenced across cathode load resistor 123 when tube 122 is made to conduct is selectively transferred or applied by way of conductors 140 and 141 and one pole of switch 132, to appropriate terminals of one or the other of recorders 136 and 137 by respective conductor pairs 142, 143 and 144, 145. Also, the output voltage evidenced across cathode load resistor 127 when tube 126 is made to conduct is applied by way of conductors 146, 147 to appropriate terminals of recorder 136, which is a dual recorder capable of recording two independent functions. Recorder stylus driving power is selectively supplied to recorder 136 from battery 111 via switch 101, wiring 131, the middle pole of switch 132 and conductor 149, battery 111 and the recorder drive each having one terminal grounded as indicated. Similarly, driving power for the recorder stylus of recorder 137 is supplied, selectively, from battery 111 through conductor 110, switch 101, wiring 131, switch 132, conductor 151, recorder 137 and ground, as indicated. Recorder paper drive power for recorder 137 is supplied by an electrically wound, electrically controlled clockwork 152 which is so arranged that the clockwork can operate only when power from a battery 152b is supplied through conductors 153, 154, 155, and switch 132, as indicated; and is further so arranged that any re-winding is automatically effected when power is so supplied. Recorder 136 is provided with a paper-drive means driven by an electric motor controlled by current supplied through leads 157, 158 from a control current generator 160 which has its output so governed by rotation of a drum 161 that the motor-driven means of recorder 136 drives the paper therein at a rate directly proportional to rotational movement of generator 160 and in only one direction. Drum 161 is rotated in one direction only by a damped wire line 162 wound thereon and leading over suitable sheaves or pulleys to the top of derrick 25 and thence to traveling block 22, to which an end of the line is secured. The arrangement may be varied widely, structurally, as is obvious, but is such that downward motion of the traveling block as drilling proceeds causes proportional rotation of drum 161 in the driving direction and a proportional output from generator 160; and such that upward motion of the traveling block permits re-winding of line 162 on drum 161 without rotation of generator 160. Thus the paper of recorder 136 is moved or driven in proportion to extension of the borehole in depth. Each recorder may be of standard or usual construction and is such that stylus deflection is proportional to voltages supplied through respective conductors from respective load resistors 123 and 127 as previously described.

Operational of the signal receiving and translating apparatus, and the recorder apparatus, etc., in providing indications of resistivity of earth formations prior to mud filtrate invasion and during invasion, and indications of self-potential, is as follows: A reference or synchronizing pressure-change signal, such as is indicated at Pa in FIG. 3, is received at the upper end of the drill string and in tubing 81. Bellows 82i and 82o and membrane 82m all flex and contact 82c closes with contact 83 for a period of time sufficient to cause motor 87 to operate. Motor 87, due to its quick-acting magnet, operates first and quickly moves shaft 90 and the wiper arms thereon one station (90°) regardless of their initial positions, following which operation of motor 88 moves the wiper arms the remainder of the distance to stations 1. If the wiper arms were initially on stations 3, motor 87 would rotate then to stations 1, after which motor 88 would rotate them a full revolution to leave them at stations 1. Spring-stressed pawl 92 holds ratchet wheel 91 and shaft 90 from reverse rotation under any influence of the return spring of motor 88. Over-running of shaft 90 and arms of the switches is prevented by inherent friction force in the switches. Thus, it is seen that receipt of a long signal pulse leaves the switch arms at stations 1. With the switches left at stations 1, current (constant) flows from battery 115 through constant current device 114 and switch 102 to commence charging capacitor C2. Also, constant current flows from battery 117 through constant current device 116, switch 103 and conductor 119 to commence charging capacitor C3. The charge accumulated by each of capacitors C2 and C3 will depend upon the time it is allowed to continue charging. The constants of the constant current devices, the capacitors, and the batteries are such as to permit a practically uniform rate of charging over a period of time at least equal to the period between two reference signals. When, then, a resistivity representing pressure-change signal, such as is represented by Pr in FIG. 3, is received, the switches are rotated by motor 87 from station 1 to stations 2, terminating charging of C2 (by opening its circuit at switch 102) but permitting continued charging of C3 through switch 103. As arm 102a arrives at station 2, the potential of the charge stored by capacitor C2 is applied through 121 to the control grid of tube 122, overcoming the normal bias and causing the latter to conduct. The current passed by tube 122 is proportional to the voltage applied to its grid by C2; and this current causes a similarity proportional voltage to be developed across resistor 123. The latter voltage obviously proportional to the voltage of C2 and hence proportional to the elapsed time between commencements of signals Pa and Pr, is applied to the leads 140 and 141 for application through switch 132 (positioned as illustrated in FIG. 1), to the appropriate channel of recorder 136, where the value is recorded. Recording is effected at this time since stylus power is provided for recorder 136 through lead 149 when switch 132 is in the indicated position.

Upon receipt of a second short-duration pressure-change signal, representing an SP measurement and such as is represented by Ps in FIG. 3, the tranducer means including membrane 82m and contact 82c again acts to energize motor 87 and thereby cause rotation of the several switch wiper arms from stations 2 to 3. As arm 103a leaves station 2, charging of C3 is terminated, leaving that capacitor charged to a potential proportional to the elapsed time between receipt of signal Pa and receipt of signal Ps. As the wiper arms arrive at stations 3, arm 102a short-circuits capacitor C2, discharging the latter. Also, arm 103a applies the potential of the charge accumulated on capacitor C3 to the control grid of electron tube 26, which, like tube 122, is normally biased slightly beyond cutoff. Thus tube 126 is caused to conduct a current proportional to the voltage applied to its control grid, and this current then produces a voltage drop across resistor 127 proportional to the elapsed time between commencement of signal Pa and that of signal Ps. The mentioned voltage drop or potential is applied by leads 146 and 147 to the second channel of recorder 136, where it is recorded as an indication of the value of self-potential (SP) as measured at the lower end of the drill string, in a manner similar to the described recording of the resistivity measurement value represented by signal Pr.

In the initial stages of reception and translation of the next succeeding reference pressure-change signal (designated Pa' on FIG. 3), motor 87 will quickly rotate switch arms 101, 102, and 103 from stations 3 to stations 4, where they will momentarily reside until motor 88 picks up and continues the rotation of shaft 90 to again position the switch arms on stations 1. During the momentary pause of switch arm 103a at station 4, capacitor C3 is discharged by short-circuit. Thus the signal receiving-translating apparatus is placed in readiness for commencement of the next signaling cycle which starts at the moment the switch arms reach stations 1.

Repetitions of the signaling cycle, initiated and controlled by the apparatus in the lower end of the drill string, cause repetitions of the cycle of operations hereinabove described, at the signal-receiving station. Stylus operating power is applied to recorder 136 only at the periods needed, by operations of switch 101.

During normal drilling, switch 132 is positioned as indicated in FIG. 1, with recorder 137 inactive and recorder 136 forming a relatively continuous record of values of earth formation resistivity and self-potential. When a new stratum is drilled into, as indicated by a relatively abrupt and appreciable change in the self-potential as indicated on the chart of recorder 136, the driller suspends drilling in such manner as hereinafter described, and then move switch 132 to the left-hand position. This starts clockwork 152 and applies driving power and resistivity signals to recorder 137. Thus recorder 137 then plots a graph indicating or showing relative change in formation resistivity with respect to time as invasion of the porous formations by drilling and filtrate progresses, the natural potential signals being unrecorded during this period. Since the permeability of the mud cake, which is thus immediately formed and allowed to remain on the walls of the borehole, is much lower than that of a porous permeable formation, the rate of invasion of the porous formation is therefore mainly controlled by the filter cake and thus the rate of change of resistivity with respect to time as invasion progresses gives an indication mainly of the porosity of the new formation into which the drill has just penetrated. It is evident that, since the filtration rate is relatively constant after such a filter cake is formed, the more porous the formation, the more filtrate and the longer the time required for invasion of a given body of the formation by mud filtrate; and, conversely, the less porous the formation, the less filtrate and the less the time needed to invade a given volume of formation. Since the rate of change in resistivity of the formation during mud filtrate invasion is a function of and a direct indication of the degree of invasion, by observing the resistivity change or rate of change with respect to time and determining the time required for the rate of change of resistivity to become substantially equal to zero, the driller can obtain an indication of formation porosity.

If, in contrast to the foregoing procedure, upon suspension of drilling, the drilling weight is removed from the bit, but rotation of the bit lightly on the borehole bottom is continued so as to prevent formation or accumulation of mud filter cake on the lower borehole walls, it is evident that the rate of mud filtrate invasion of the newly penetrated portion of the formation will then not be controlled by a filter cake but will be substantially a function of the permeability of the formation itself, and therefore the rate of mud filtrate invasion into such formation (as indicated by the change of formation resistivity with respect to time, on recorder 137) and the time required for the rate of change of resistivity to become substantially equal to zero furnishes an indication which is mainly indicative of the permeability of the formation. Thus the invention provides a means and method of securing an indication of the porosity of a newly penetrated permeable stratum, and a means and method of securing an indication of the permeability of a formation.

It is evident that in drilling from one stratum into the next lower stratum, the resistivity may increase, or it may decrease. Which change occurs depends upon several factors, such as the relative resistance of connate fluids in the two strata, the porosities of the two formations, etc. It is also evident that, as invasion of a formation proceeds, as, for example, during suspension of drilling, the resistivity may increase with time, or it may decrease as the invention proceeds. For example, if the connate fluid in the formation were petroleum or hydrocarbon gases, the resistivity would decrease as the petroleum was displaced by a more conductive mud filtrate; and, conversely, if the connate fluid were salt water, the resistivity could well be increased by displacement by a less conductive mud filtrate. Changes of both natures are indicated in the graphs of FIGS. 4 and 5, the former depicting a typical increase in resistivity as invasion proceeds and the latter figure depicting the converse change. Thus, it is apparent that the indication of porosity (and/or permeability) must be related to the rate of change of the electrical characteristic, rather than alone to the direction of the change. As shown in FIGURES 4 and 5, the value of the resistivity approaches an equilibrium level after a given time. By maintaining the resistivity measurement until such equilibrium level is substantially achieved, that is, until the rate of change of resistivity becomes substantially equal to zero, and by measuring the time required for this equilibrium level to be reached, the driller can obtain an indication of formation porosity (and/or permeability). Since in all except the most impermeable formations the permeability of the formation will be greater than that of the mud cake formed on the lower borehole walls, the rate of invasion, as indicated by the time rate of change of resistivity is inversely related to the porosity of the penetrated formation, when mud cake is permitted to form. When the mud cake is prevented from forming on the lower borehole walls (by maintaining bit rotation without weight to keep the walls clean), the rate of invasion, as indicated by the time rate of change of resistivity, is a clear indication of the permeability of the formation.

From the above it is seen that by repetitive measurements of changeable values of such an electrical characteristic as resistivity of a portion of the earth at the lower end of the borehole as the portion of the earth is invaded by mud filtrate, and by forming signals indicative of the measured values and transmitting, receiving and forming indications of the received signals, an indication of such a functionally related physical characteristic of the earth as its porosity and/or its permeability, may be had. Thus the described investigation of a formation characteristic at a relatively inaccessible location in an earth borehole yields, by the apparatus of the invention, an indication of a different, but functionally related, characteristic of the formation at an accessible place exterior of the borehole.

The term "mud" or drilling mud, as used herein, is not to be necessarily limited to conventional aqueous mixtures or slurries, but includes any drilling fluid used in connection with any drilling process, and capable of, at least in part, infiltrating porous and permeable earth formations and thereby changing the measurable electrical characteristics or properties of the infiltrated portions of such formations. Insofar as measurement of porosity of earth formations is concerned, as herein described, the drilling fluid mud should also have the ability, as is usual with conventional drilling muds, of quickly forming a so-called low water loss, or low permeability mud cake or filter cake on the walls of the drilled borehole.

It is evident that the physical apparatus employed to obtain the novel results of the invention may, in the light of the present disclosure, be widely varied within the scope and principles of the invention. The invention is not to be limited to the specific mode and means disclosed, but what is claimed is:

1. A method of providing at a point exterior to an earth borehole an indication of the porosity of a newly-penetrated portion of the earth at the lower end of an earth-penetrating borehole being drilled, comprising: drilling a borehole while circulating mud through the borehole, and concurrently with said drilling and circulating, measuring a function of earth electrical conductivity at the lower end of the borehole and signaling an indication of the measurement to said exterior point; and temporarily suspending drilling under conditions to permit invasion of the earth at the bottom of the borehole by mud filtrate and deposition of a mud cake on the borehole walls, and during such suspension of drilling measuring with respect to time and signaling indications of the measurements of the said function of earth electrical conductivity at the bottom of the borehole to said point, to provide at said point an indication of the variation of the electrical conductivity function of the newly-penetrated portion of the earth at the lower end of the borehole during invasion of such portion by mud filtrate, such measurements being continued until said electrical conductivity function has substantially ceased to change with time, such variation of the electrical conductivity function being functionally related to the porosity of the portion of the earth invaded by mud filtrate.

2. A method of providing at a point exterior to an earth borehole an indication of the porosity of a newly-penetrated portion of the earth at the lower end of an earth-penetrating borehole being drilled, comprising: drilling a borehole, and concurrently with said drilling, measuring a value of a function of earth electrical conductivity at the lower end of the borehole and signalling an indication of the measurement value to said point; recording at said point the signaled indication of said measurement value; suspending drilling under conditions to permit invasion of a portion of the earth at the bottom of the borehole by the mud filtrate and deposition of a mud cake on the borehole walls, and during such suspension of drilling, measuring with respect to time values of, and signaling indications of the measurement values of, said function of the earth electrical conductivity at the bottom of the borehole, to said point, said measurement step being continued until said electrical conductivity function has substantially ceased to change with time; receiving and recording at said point the signaled indications of the values of the measurements effected during such suspension of drilling, with respect to time, to provide at said point indications of the time rate of change of earth electrical conductivity of said portion of the earth at the lower end of the borehole during invasion thereof by mud filtrate, the said rate of change of electrical conductivity of said portion of the earth being inversely related functionally to the porosity of the said portion of the earth.

3. A method of obtaining an indication of a physical characteristic of a newly penetrated portion of the earth adjacent the lower end of an earth-penetrating borehole being drilled while using a drilling fluid capable of changing the electrical characteristic of formation penetrated by said borehole, comprising: measuring the value of an electrical characteristic of the newly penetrated portion of the earth adjacent the bottom of the borehole prior to appreciable invasion thereof by said drilling fluid, said electrical characteristic being such as to vary in value as invasion of the said portion of the earth by said drilling fluid occurs; suspending penetration into said portion of the earth while maintaining bit rotation without weight thereon to prevent formation of filter cake on the borehole wall in said portion of the earth; and substantially immediately thereafter measuring with respect to time the value of said electrical characteristic of said portion of the earth after initial invasion thereof by said drilling fluid, said measuring step being continued until the value of said electrical characteristic has substantially ceased to change with time.

4. A method of drilling and logging an earth borehole, comprising drilling a borehole while utilizing a drilling fluid capable by invasion of changing the resistivity of formation penetrated by such borehole, and concurrently with the drilling, logging the resistivity of the earth adjacent the bottom of the extension of the borehole prior to invasion thereof by drilling fluid; suspending drilling; and during suspension of drilling logging with respect to time the changing resistivity of the earth adjacent the bottom of the extension of the borehole as initial invasion thereof by drilling fluid progresses, such logging step being continued until said resistivity has substantially ceased to change with time.

5. A method of obtaining an indication of the value of a physical characteristic of a newly penetrated porous earth formation adjacent the lower end of an earth borehole being drilled comprising: drilling a borehole while using therein a drilling fluid capable, by infiltration, of changing an electrical characteristic of porous earth formations penetrated by said borehole, and measuring the values of said electrical characteristic of the penetrated earth formations adjacent the lower end of the borehole as such drilling progresses; suspending drilling substantially immediately following a change in the thus-measured value of said electrical characteristic which is indicative of initial penetration by said borehole into a newly penetrated porous earth formation; and during a period of time commencing substantially immediately following such suspension and during continued suspension of drilling, measuring the changing value of said electrical characteristic with respect to time of said newly penetrated earth formation adjacent the lower end of the borehole, resulting from progressive invasion thereof by filtrate from said drilling fluid, said measurement step being continued until the value of said electrical characteristic has substantially ceased to change as a function of time.

6. A method according to claim 5 in which the pressure of said drilling fluid in the said lower end of said borehole is substantially constant during said measuring of the changing values of said electrical characteristic with respect to time.

7. A method as defined in claim 5, and after suspending drilling permitting drilling fluid filter cake to form on the walls of the newly penetrated earth formations adjacent the lower end of the borehole, and in which said physical characteristic is porosity and said electrical characteristic is a function of resistivity.

8. A method as defined in claim 5 and after supending drilling maintaining bit rotation without weight thereon to prevent drilling fluid filter cake from forming on the walls of the said newly penetrated earth formations adjacent the lower end of the borehole and in which said physical characteristic is permeability and said electrical characteristic is a function of resistivity.

References Cited in the file of this patent

UNITED STATES PATENTS 2,700,131     Otis et al. _____ Jan. 18, 1955